(12) United States Patent
Huang et al.

(10) Patent No.: US 8,810,935 B2
(45) Date of Patent: Aug. 19, 2014

(54) ACTUATOR

(75) Inventors: Chen Yi Huang, Taichung (TW); Te Sheng Tseng, Taichung (TW); Wen Hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 502 days.

(21) Appl. No.: 13/154,511

(22) Filed: Jun. 7, 2011

(65) Prior Publication Data
US 2012/0222503 A1    Sep. 6, 2012

(30) Foreign Application Priority Data

Mar. 2, 2011 (TW) .............................. 100106860 A

(51) Int. Cl.
*G02B 27/00* (2006.01)
*G02B 7/02* (2006.01)

(52) U.S. Cl.
USPC ............ 359/824; 310/12.16; 310/28; 310/38; 348/374

(58) Field of Classification Search
USPC ............ 310/12.16, 28, 38; 348/374; 359/824, 359/814
See application file for complete search history.

(56) References Cited

U.S. PATENT DOCUMENTS

| 6,157,779 | A * | 12/2000 | Kosaka et al. | 396/55 |
| 6,945,045 | B2 * | 9/2005 | Hara et al. | 60/527 |
| 7,177,539 | B2 * | 2/2007 | Ito et al. | 396/85 |
| 7,307,653 | B2 | 12/2007 | Dutta | |
| 7,589,922 | B2 * | 9/2009 | Higuchi | 359/824 |
| 8,098,985 | B2 * | 1/2012 | Tseng et al. | 396/133 |
| 8,441,749 | B2 * | 5/2013 | Brown et al. | 359/823 |
| 2006/0092285 | A1 | 5/2006 | Shin | |
| 2009/0295986 | A1 * | 12/2009 | Topliss et al. | 348/374 |
| 2010/0033852 | A1 * | 2/2010 | Ke | 359/824 |
| 2010/0110571 | A1 * | 5/2010 | Ono et al. | 359/824 |

FOREIGN PATENT DOCUMENTS

| WO | 2010089529 A1 * | 8/2010 | H04N 5/225 |
| WO | 2010012991 A2 * | 11/2010 | F03G 7/06 |

* cited by examiner

*Primary Examiner* — Burton Mullins
(74) *Attorney, Agent, or Firm* — Morris Manning & Martin LLP; Tim Tingkang Xia, Esq.

(57) ABSTRACT

This invention provides an actuator, comprising: a supporting frame having a movable element accommodation space; a movable element received by the movable element accommodation space of the supporting frame, at least one elastic element accommodation space and at least one electrically-driven element accommodation space being arranged in proximity to each other around the exterior thereof; an electrically-driven element received by the at least one electrically-driven element accommodation space and configured to cause the movable element to move with respect to at least one axis; and an elastic element configured to provide an elastic force with respect to at least one axis, wherein the elastic element is received by the at least one elastic element accommodation space and able to perform a sliding function with the at least one elastic element accommodation space.

8 Claims, 3 Drawing Sheets

ACTUATOR

CROSS-REFERENCE TO RELATED APPLICATIONS

This non-provisional application claims priority under 35 U.S.C. §119(a) on Patent Application No. 100106860 filed in Taiwan, R.O.C. on Mar. 2, 2011, the entire contents of which are hereby incorporated by reference.

BACKGROUND OF THE INVENTION

1. Field of the Invention

The present invention relates to an actuator, and more particularly, to an actuator featuring fewer parts and lower cost.

2. Description of the Prior Art

US Publication No. 2006/0092285 discloses an optical image stabilizer for camera lens assembly comprising: a holder having a movable element accommodation space; a movable element having a light-sensing element and connected with the holder, the movable element and the holder being spaced apart from each other; a magnetic element set connected with the movable element; a set of balls comprising at least three balls and interposed between the movable element and the holder; and an electrically-driven element configured to cause the movable element to move in the X plane and Y plane; wherein the magnetic element set provides a magnetic force to keep the set of balls between the movable element and the holder.

Though the aforementioned technology enables the movable element to move with respect to two axes, flux leakage may occur easily in the magnetic element and affect peripheral electronic components. Moreover, the assembly of numerous parts is not easy, and the large number of parts also makes it difficult to reduce the size and cost of the product.

Moreover, U.S. Pat. No. 7,307,653 discloses an image stabilizer for a micro-camera module of a handheld device, and method for stabilizing a micro-camera module of a handheld device. The handheld device comprises a module, a motion sensor, an actuator comprising a first actuator assembly and a second actuator assembly configured to cause respective movements of the module in two substantially perpendicular directions, and a controller.

SUMMARY OF THE INVENTION

To overcome drawbacks of the prior art technology, the present invention provides an actuator featuring fewer parts and lower cost.

The present invention provides an actuator comprising: a supporting frame having a movable element accommodation space, at least one first elastic element accommodation space and at least one first electrically-driven element accommodation space; a movable element received by the movable element accommodation space of the supporting frame, at least one second elastic element accommodation space and at least one second electrically-driven element accommodation space being arranged in proximity to each other around the exterior thereof; an electrically-driven element received by the at least one first electrically-driven element accommodation space and the at least one second electrically-driven element accommodation space and configured to cause the movable element to move with respect to at least one axis; and an elastic element configured to provide an elastic force with respect to at least one axis, wherein the elastic element is received by the at least one first elastic element accommodation space and the at least one second elastic element accommodation space and able to perform a sliding function with the at least one second elastic element accommodation space.

DETAILED DESCRIPTION OF THE PREFERRED EMBODIMENTS

The present invention will be described more fully hereinafter with reference to the accompanying drawings, in which preferred embodiments of the present invention are shown.

Figure 1A:
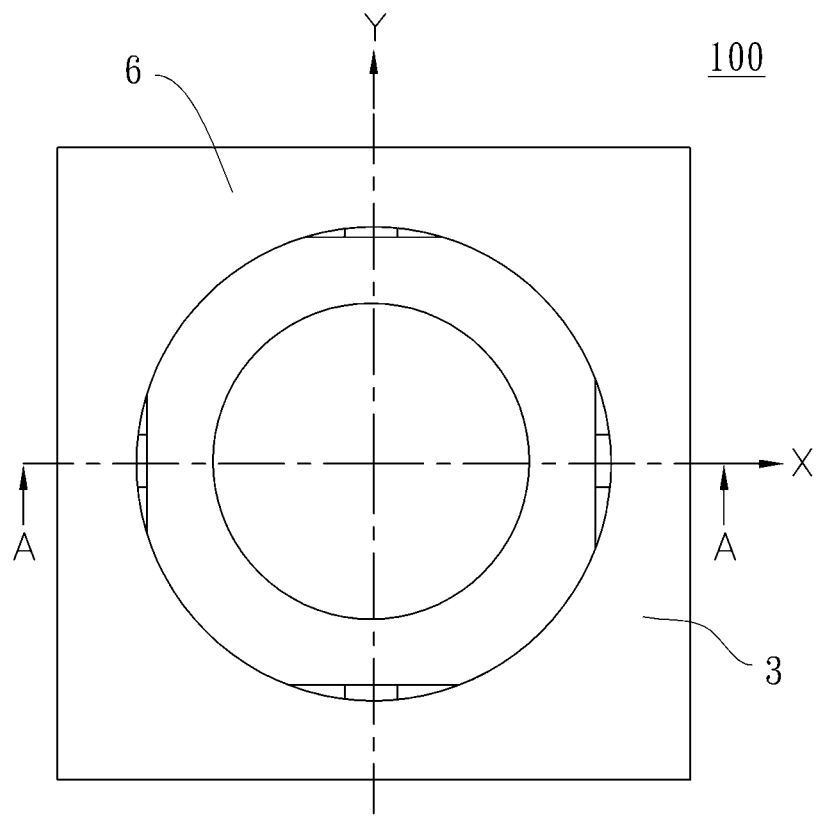
FIG. 1A is a top view showing an actuator in accordance with a first embodiment of the present invention.
Figure 1B:
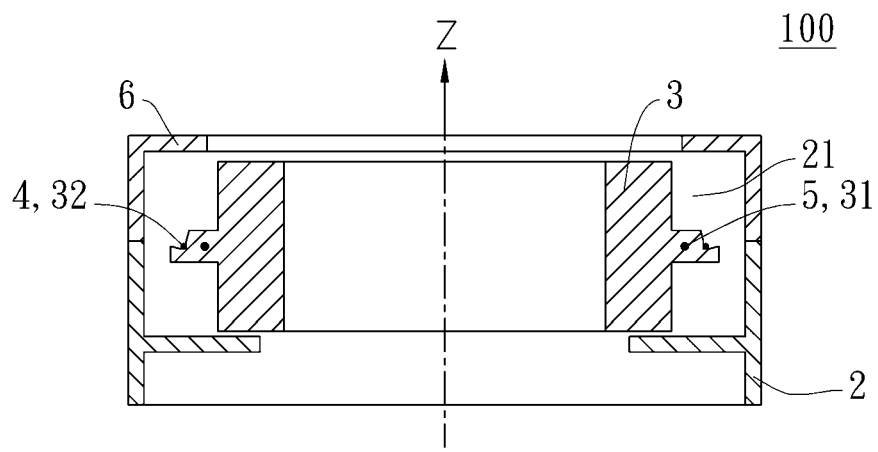
FIG. 1B is a section view of the actuator taken along the line A-A in FIG. 1A.
Figure 2:
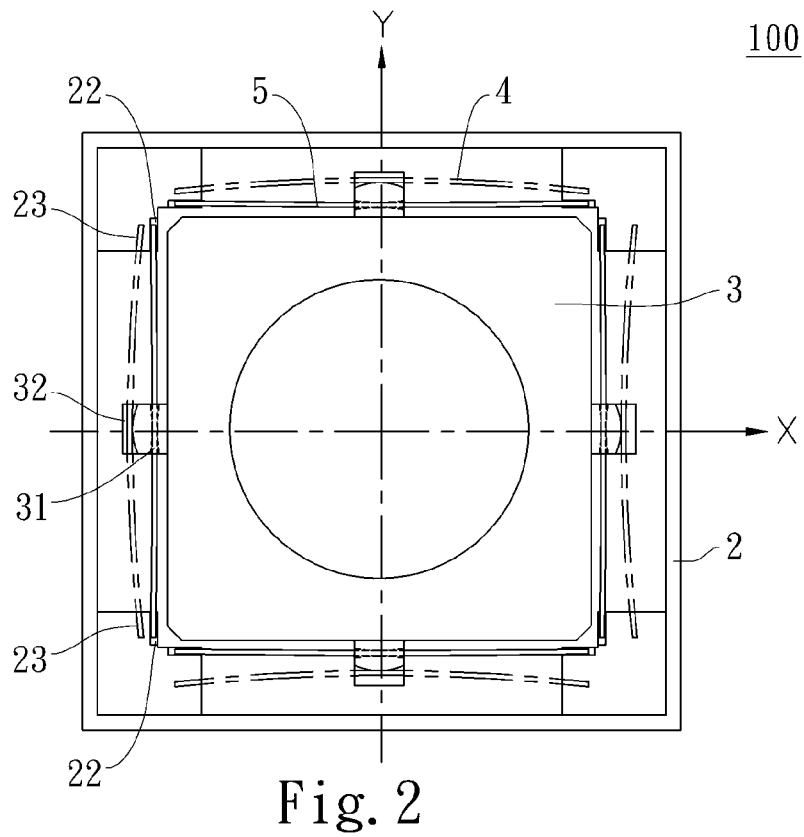
FIG. 2 is a top view showing the actuator without a cover in accordance with the first embodiment of the present invention.

FIG. 1A is a top view showing an actuator 100 in accordance with a first embodiment of the present invention, and FIG. 1B is a section view of the actuator 100 taken along the line A-A in FIG. 1A. FIG. 2 is a top view showing the actuator 100 without a cover 6 in accordance with the first embodiment of the present invention. In the first embodiment of the present invention, there is an actuator 100, comprising: a supporting frame 2 having a movable element accommodation space 21, four first elastic element accommodation spaces 22 and four first electrically-driven element accommodation spaces 23, wherein the four first elastic element accommodation spaces 22, as well as the four first electrically-driven element accommodation spaces 23, are arranged respectively at the four corners of the supporting frame 2; a movable element 3 with a hollow space near the optical axis and comprising four second elastic element accommodation spaces 31 and four second electrically-driven element accommodation spaces 32, the four second elastic element accommodation spaces 31, as well as the four second electrically-driven element accommodation spaces 32, being arranged respectively at the four sides of the movable element 3 corresponding to the four first elastic element accommodation spaces 22 and the four first electrically-driven element accommodation spaces 23 of the supporting frame 2, the movable element 3 being received by the movable element accommodation space 21 of the supporting frame 2; an electrically-driven element 4 received by the first electrically-driven element accommodation space 23 of the supporting frame 2 and the second electrically-driven element accommodation space 32 of the movable element 3 and configured to cause the movable element 3 to move with respect to at least two axes which are perpendicular to the optical axis, wherein the electrically-driven element 4 is able to perform a sliding function with the second electrically-driven element accommodation space 32 of the movable element 3; an elastic element 5 configured to provide an elastic force with respect to at least two axes, wherein the elastic element 5 is received by the first elastic element accommodation space 22 of the supporting frame 2 and the second elastic element accommodation space 31 of the movable element 3 and able to perform a sliding function with the second elastic element accommodation space 31 of the movable element 3; and a cover 6 disposed on and connected with the supporting frame 2.

Preferably, the electrically-driven element 4 comprises a shape memory alloy (SMA) or a Voice Coil Motor (VCM). Alternatively, the electrically-driven element 4 comprises a piezoelectric material. The elastic element 5 is a linear spring, a flat spring or a helical spring.

FIG. 2 is a top view showing the actuator 100 without the cover 6 in accordance with the first embodiment of the present invention. As shown in FIG. 2, four electrically-driven elements 4, as well as four elastic elements 5, are disposed respectively at the four sides of the movable element 3. In the first embodiment of the present invention, each of the four electrically-driven elements 4 comprises a SMA received by the first electrically-driven element accommodation space 23 and the second electrically-driven element accommodation space 32, and each of the four elastic elements 5 is a linear spring received by the first elastic element accommodation space 22 and the second elastic element accommodation space 31. When the electric current is supplied to the electrically-driven element 4, heat is generated in the interior of the SMA and causes a change in the length of the SMA, thereby the curved electrically-driven element 4 becomes straight and the change in the length of the electrically-driven element 4 exerts a force to the movable element 3 to cause the movement of the movable element 3. For example, the electric current can be simultaneously supplied to the SMAS disposed respectively at the left, right, top and bottom sides of the movable element 3 so as to cause the movable element 3 to move with respect to the positive X-axis and negative Y-axis at the same time, and the magnitude of the applied electric current is determined depending on the amount of movement required. In other words, the electric current can be supplied to any one of the four SMAS or a pair of SMAS movable with respect to the X-axis or Y-axis, depending on the axis with respect to which the movable element 3 is to move and the amount of movement required. In this embodiment, the movement of the movable element 3 with respect to the X-axis and Y-axis can be controlled by controlling the two pairs of SMAS movable with respect to the X axis and Y axis, respectively. When the magnitude of the electric current is decreased, the degree of changes in the length of the SMA is smaller, and then the restoring force of the elastic element 5 brings the movable element 3 back to the initial position. That is, the restoring force causes the movable element 3 to move with respect to the negative X-axis and positive Y-axis to return to the initial position. Therefore, the actuator 100 of the first embodiment of the present invention can be disposed at a proper position of a photographing module (not shown), and an appropriate electric current can be supplied to the two pairs of SMAS to control the movement of the movable element 3 with respect to the X-axis and Y-axis.

Figure 3:
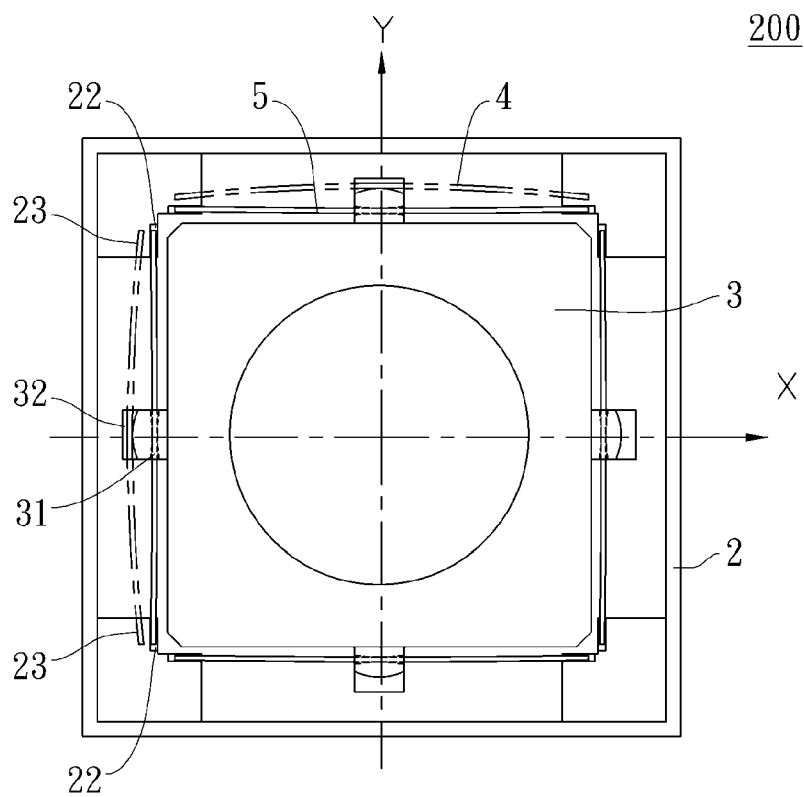
FIG. 3 is a top view showing an actuator in accordance with a second embodiment of the present invention.

FIG. 3 is a top view showing an actuator 200 in accordance with a second embodiment of the present invention. In the actuator 200, two electrically-driven elements 4 are disposed respectively at two adjacent sides of the movable element 3, and four elastic elements 5 are disposed respectively at the four sides of the movable element 3. Each of the two electrically-driven elements 4 comprises a SMA, and each of the four elastic elements 5 is a linear spring. The operation of the electrically-driven element 4, the elastic element 5 and the movable element 3 with respect to each other has been described above, thus no further discussion will be made here.

Figure 4:
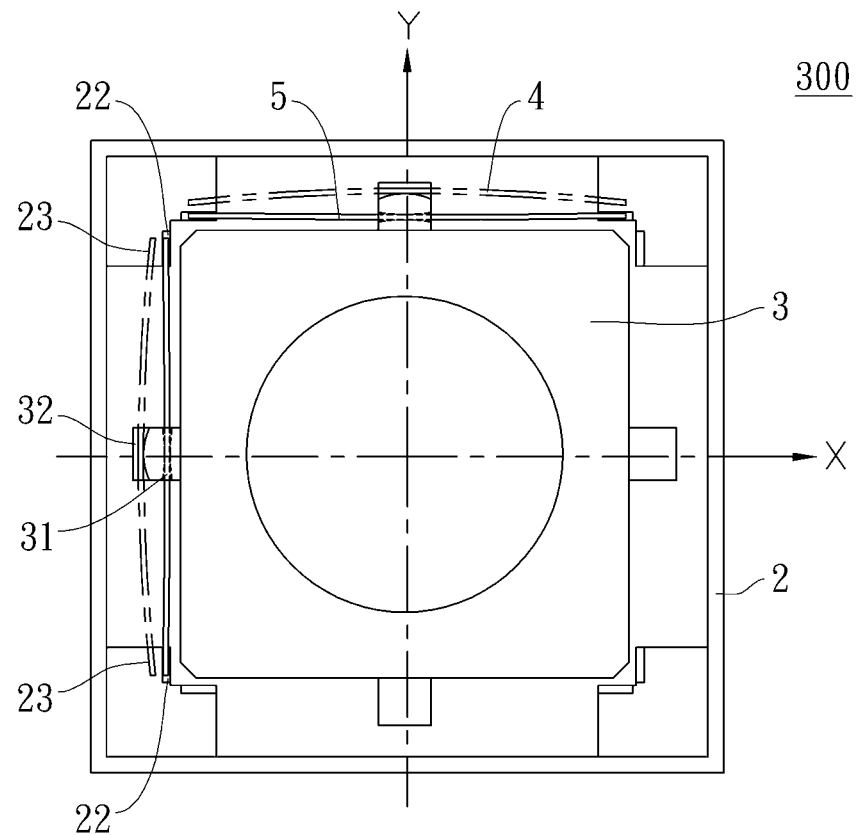
FIG. 4 is a top view showing an actuator in accordance with a third embodiment of the present invention.

FIG. 4 is a top view showing an actuator 300 in accordance with a third embodiment of the present invention. In the actuator 300, two electrically-driven elements 4, as well as two elastic elements 5, are disposed respectively at two adjacent sides of the movable element 3. Each of the two electrically-driven elements 4 comprises a SMA, and each of the two elastic elements 5 is a linear spring. The operation of the electrically-driven element 4, the elastic element 5 and the movable element 3 with respect to each other has been described above, thus no further discussion will be made here.

Figure 5:
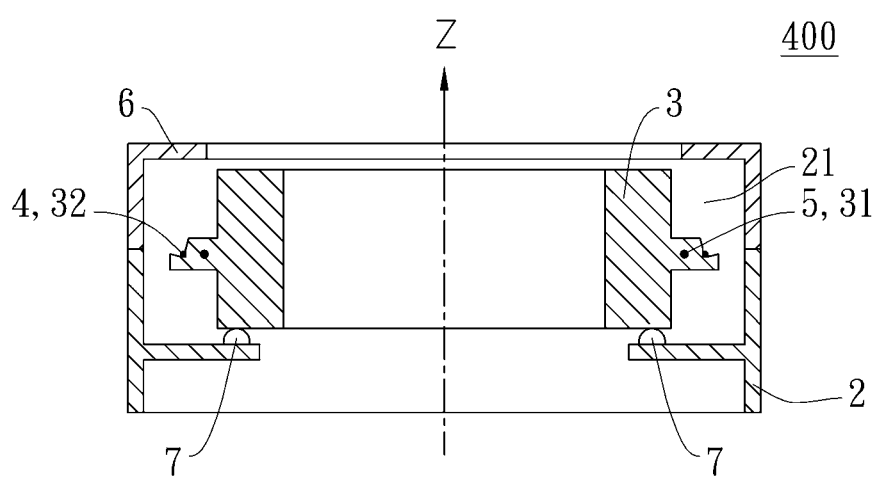
FIG. 5 is a top view showing an actuator in accordance with a fourth embodiment of the present invention.

FIG. 5 is a top view showing an actuator 400 in accordance with a fourth embodiment of the present invention. In this embodiment, the actuator 400 further comprises at least one ball 7 arranged between the movable element 3 and the supporting frame 2 so as to reduce its vibration and stabilize itself with respect to the Z-axis. Alternatively, the actuator 400 is provided with at least one ball 7 (not shown) arranged between the movable element 3 and the cover 6 so as to reduce its vibration and stabilize itself with respect to the Z-axis.

The preferred embodiments described above are exemplary and are not intended to limit the claim scope of the present invention. Various modifications and variations made within the spirit of the invention to achieve equivalent effect shall be considered as falling within the scope of the appended claims.

What is claimed is:

1. An actuator comprising:
   a supporting frame having a movable element accommodation space, at least one first elastic element accommodation space and at least one first electrically-driven element accommodation space;
   a movable element received by the movable element accommodation space of the supporting frame, at least one second elastic element accommodation space and at least one second electrically-driven element accommodation space being arranged in proximity to each other around an exterior thereof;
   an electrically-driven element received by the at least one first electrically-driven element accommodation space of the supporting frame and the at least one second electrically-driven element accommodation space of the movable element and configured to enable the movable element to move along at least one axis; and
   an elastic element configured to provide an elastic force with respect to at least one axis, wherein the elastic element is received by the at least one first elastic element accommodation space of the supporting frame and the at least one second elastic element accommodation space of the movable element, and the movable element can slide along the elastic element and move in a direction perpendicular to an optical axis.

2. The actuator according to claim 1, wherein the electrically-driven element comprises a shape memory alloy (SMA).

3. The actuator according to claim 1, wherein the electrically-driven element comprises a piezoelectric material.

4. The actuator according to claim 1, wherein the electrically-driven element comprises a voice coil motor (VCM).

5. The actuator according to claim 1, wherein the elastic element can be a linear spring and received by the at least one first elastic element accommodation space and the at least one second elastic element accommodation space corresponding to the electrically-driven element.

6. The actuator according to claim 1, wherein the elastic element can be a flat spring and received by the at least one first elastic element accommodation space and the at least one second elastic element accommodation space corresponding to the electrically-driven element.

7. The actuator according to claim 1, wherein the elastic element can be a helical spring and received by the at least one first elastic element accommodation space and the at least one second elastic element accommodation space corresponding to the electrically-driven element.

8. The actuator according to claim 1, wherein the electrically-driven element is received by the at least one second electrically-driven element accommodation space of the movable element, and the movable element can slide along the electrically-driven element.

\* \* \* \* \*